[11] 3,630,012

United States Patent

| [72] | Inventor | Horst C. G. H. Guertler<br>Cheadle Hulme, England |
|---|---|---|
| [21] | Appl. No. | 779,264 |
| [22] | Filed | Nov. 26, 1968 |
| [45] | Patented | Dec. 28, 1971 |
| [73] | Assignee | Rex Asbestwerke Graf von Rex KG<br>Schwabisch Hall<br>Germany |
| [32] | Priorities | Jan. 25, 1965 |
| [33] | | Great Britain |
| [31] | | 3,170/65;<br>Jan. 25, 1965, Great Britain, No. 3,171/65;<br>Mar. 23, 1966, Germany, No. P 16 69 524.2<br>Continuation-in-part of application Ser. No. 522,029, Jan. 21, 1966, now abandoned,<br>Continuation-in-part of application Ser. No. 625,307, Mar. 23, 1967, now abandoned.<br>This application Nov. 26, 1968, Ser. No. 779,264 |

[54] ASBESTOS FABRICATING PROCESS AND PRODUCTS THEREOF
13 Claims, No Drawings

| [52] | U.S. Cl. | 57/153,<br>57/58.89, 57/164, 161/176, 162/3, 162/153,<br>162/155, 264/183, 264/211 |
|---|---|---|
| [51] | Int. Cl. | A01d 43/00,<br>C04b 43/04, D01d 5/14 |
| [50] | Field of Search | 162/153,<br>3, 155; 161/175; 57/139, 164, 153,<br>58–89; 264/108, 211, 181–184 |

[56] References Cited
UNITED STATES PATENTS

| 2,769,713 | 11/1956 | Wilson | 92/21 |
|---|---|---|---|
| 3,025,130 | 3/1962 | White | 264/184 |
| 3,338,994 | 8/1967 | Heron | 264/41 |
| 2,089,021 | 8/1937 | Loster | 57/139 |
| 2,758,941 | 12/1951 | Novak et al. | 57/156 |
| 2,972,221 | 2/1961 | Wilke et al. | 264/103 X |
| 2,955,017 | 10/1960 | Boyer | 264/183 |
| 3,442,997 | 5/1969 | Parratt | 264/211 |
| 3,452,532 | 7/1969 | Wilke et al. | 57/139 |
| 3,342,921 | 9/1967 | Prandege et al. | 264/200 |
| 3,453,818 | 7/1969 | Novak et al. | 57/58.89 |

*Primary Examiner*—Jay H. Woo
*Attorney*—Curt M. Avery

ABSTRACT: A dispersion of chrysolite asbestos in water with soap as dispersion medium is given an addition of sharpening agent consisting of aluminum sulfate or other acidic soap-precipitant substance in a quantity below the threshold at which the precipitant causes coagulation of asbestos. Preferably the added quantity of sharpening agent is 20 to 80 percent of its threshold quantity. This, for example, amounts to 50–200 g. of aluminum sulfate per kg. of dry soap content in a 2 percent asbestos dispersion. The sharpening agent is added in such a manner as to prevent local or partial coagulation. This is done by first dissolving the sharpening agent in the water subsequently used for preparing the asbestos dispersion, or by dissolving the sharpening agent in water and stirring the solution into the previously prepared aqueous dispersion. The addition improves storability and extrudability of the dispersion as well as the tensile strength of the asbestos strand or yarn made therefrom.

ASBESTOS FABRICATING PROCESS AND PRODUCTS THEREOF

This is a continuation-in-part of my applications Ser. No. 522,029, filed Jan. 21, 1966, and now abandoned and Ser. No. 625,307, filed Mar. 23, 1967, and now abandoned.

My invention relates to a process of making yarn or other coherent structures composed of asbestos fibers, and to asbestos products made by the process.

Dispersions of asbestos fiber produced, for example, by using water-soluble soaps and chrysotile asbestos can be made into coherent fibrous structures by being ejected through a shaping device into contact with a precipitating liquid. The latter causes coagulation of the fibers by reacting with the dispersing agents, such as the soaps, in the dispersion to destroy their dispersing action. Such processes are described in German Pat. No. 1,168,012 and in U.S. Pat. No. 2,972,221. When such dispersions are aqueous, the dispersing action can be brought about by using a water-soluble soap preferably together with another anionic surface-active (wetting) agent, though it is also possible to use the soap or the other surface-active agent alone. The latter can be an alkylaryl sulfonate, an alkyl sulfosuccinate, or a sulfated higher alcohol. An especially suitable mixture of dispersing agents contains one part of anionic wetting agent added to six parts of soap.

An example composition of such a dispersion is as follows:

| | |
|---|---|
| Tap water with a hardness of about 30 p.p.m., calculated as calcium carbonate (at 60° C.) | 1,000 parts |
| Chrisotile asbestos (Grade 2) | 20 parts |
| Sodium dodecyl benzene sulfonate | 1.2 parts |
| Soap (sodium salts of mixed long-chain fatty acids) | 7 parts |

Even though such dispersions may be colloidal or substantially colloidal, they are not particularly smooth and free-flowing. Their storage or shelf life is rather limited, and their use in the manufacture of asbestos yarn material generally requires operating appreciably above normal room temperature. It has also been found that coherent structures, particularly threadlike structures, made from such dispersions are sometimes uneven and have low resistance to tearing, which makes it difficult to wind them onto spools. Such difficulties are aggravated when a certain degree of fineness is exceeded and when the threadlike structures have a comparatively large cross section.

It seems that these difficulties are due to the fact that the precipitating media, which are intended to react with the water-soluble soaps in the precipitating bath, penetrate the structure only slowly. This is because as soon as the aqueous dispersion of asbestos fibers issues as a shaped strand or filament into the coagulating liquid, the precipitating agent abruptly causes a coagulated skin to be formed on the filament. The superficially precipitated dispersing agents, such as the soap and/or wetting agents, thus impede the penetration of further precipitant into the structure.

It is an object of my invention to minimize or obviate the above-mentioned shortcomings of the known processes of making filaments, threads, yarn or the like coherent structures of asbestos by passing an aqueous dispersion of asbestos fiber, containing soap and/or anionic surface-active wetting agent, through a shaping device and bringing the strand of dispersion thus formed into contact with a precipitating medium.

My invention is based upon the discovery that if any such aqueous dispersion of fibrous asbestos, containing a water-soluble soap with or without another anionic surface-active dispersing agent, is given an admixture of additional substance capable of reacting with and precipitating the soap but too small in quantity to be thus effective, such admixture operates to not only improve the asbestos dispersion in smoothness and flow properties but also prolongs the storage life of the dispersion, affords or facilitates its use at normal room temperature (about 20° C.) if desired, and improves the mechanical properties of the resulting strand product, particularly as regards tensile strength and resistance to tearing.

Since the added substance operates as a promoter or sharpener of the subsequent coagulation in the interior of the filament or strand ejected into and through the bath of coagulant proper, the additive medium—for simplicity and distinction—will be hereinafter also referred to as "sharpening" agent, not withstanding its homogenizing and other beneficial effects above mentioned.

The sharpening agent added to the asbestos dispersion and the coagulating precipitant liquid subsequently acting upon the strand formed of the dispersion may differ from each other or may be the same chemically.

Preferably the sharpening agent added to the asbestos fiber dispersion before shaping is aluminum sulfate or another aluminum salt. Also applicable are other acidic (nonbasic) compounds such as lead nitrate, copper sulfate, zinc chloride, calcium chloride, magnesium sulfate, thorium nitrate, mixtures of these or similar multivalent-metal salts, or such further precipitant compounds as known, for example, from U.S. Pat. No. 2,972,221 of Wilke et al. (column 4, lines 50 to 65). Also, acids such as sulfurous, sulfuric, or hydrochloric acid can be used. When calcium chloride or magnesium sulfate is used with tap water, it should be borne in mind that the latter often contains sufficient concentrations of these substances to affect the calculation of the amount of the salt that has to be added.

When such a sharpening compound or mixture is added progressively to a dispersion of colloidal asbestos fiber, a point is reached, depending upon the quantity added, at which the colloidal condition of the dispersion just remains stable, but beyond which coagulation and lump formation occurs. It is important to the process of the invention that such coagulation does not occur before the asbestos fiber dispersion is shaped to a strand. Therefore, the quantity of sharpening agent present in the dispersion before the latter is passed through the forming or shaping device into the precipitation bath must be less than the threshold amount necessary for coagulation. The critical quantity of sharpening agent that can be added to the dispersion without causing coagulation before shaping the strand can easily be determined by testing. It is recommended for reliable results that between 10 percent and 80 percent by weight of the threshold quantity needed for coagulation of the dispersion be added to the dispersion.

It has been found preferable, however, to add at least 20 percent of the threshold amount, best results with respect to extrudability of the asbestos dispersion and tensile strength of the thread or yarn product having been obtained with an addition of sharpening agent between about 35 percent and about 65 percent of the threshold quantity.

When admixing the sharpening agent it is essential to prevent local or partial coagulation in the dispersion as manifested by the occurrence of film formation within the unextruded dispersion. It is, therefore, preferable, or for some compositions virtually necessary, not to pour the sharpening agent into the dispersion but to dissolve the sharpening agent in water and then slowly and thoroughly admix the solution with the dispersion. Another way to add the sharpening agent to the water subsequently used for making the dispersion, instead of adding the agent to the dispersion itself.

The invention will next be described in conjunction with the following example:

A 2 percent asbestos fiber dispersion containing a water-soluble soap was prepared with the same composition as the example specified above. This dispersion begins to coagulate when a quantity of aluminum sulfate ($Al_2(SO_4)_3 \cdot 18H_2O$) equal to 240 g. per 100 g. of the (dry) soap in the dispersion is added to the dispersion. If this aluminum sulfate ratio to soap is taken as unity, the corresponding threshold values for certain other materials are as follows:

| | |
|---|---|
| Sulfurous acid (reckoned as $SO_2$) | 0.29 |
| Copper sulfate $CuSO_4 \cdot 5H_2O$ | 1.13 |
| Zinc chloride $ZnCl_2$ | 0.61 |
| Calcium chloride $CaCl_2$ | 0.50 |
| Magnesium sulfate $MgSO_4 \cdot 7H_2O$ | 1.11 |
| Calcium carbonate | 0.45 |
| Calcium oxide | 0.25 |

The improvement due to the addition of aluminum sulfate becomes useful only when the amount of aluminum sulfate added is at least 30 grams per kg. of dry soap in the dispersion. It is preferred to add from 50 to 200 grams of aluminum sulfate per kg. of dry soap in the dispersion. Thus to the typical dispersion quoted above as an example, an amount of 1.25 parts by weight of aluminum sulfate may be added. As explained, this amount of sharpening agent is either added to the water subsequently used for preparing the dispersion, or is separately dissolved in water, the solution then being slowly and continuously stirred into the previously prepared dispersion. This prevents local film formation due to partial coagulation.

The dispersion now containing the aluminum sulfate is passed by means of a forming or shaping device into a precipitation bath which contains 20–50 g. of aluminum sulfate per liter of tap water to cause coagulation of the dispersion. The asbestos fiber is formed into coherent structures such as threads, fibrous tapes or bands. The danger of breakage of such structures is greatly reduced compared to known structures which have been formed from dispersions in which the sharpening agent is absent. No trouble is encountered when winding the threads or thin fibrous bands, whereas previously the known structures could not readily be wound without impairment.

As mentioned, the invention also improves the smoothness and flow properties of the dispersion, affords storing the dispersion a longer time before use, and permits using it in the cold state, whereas hitherto such dispersions have had to be used fairly quickly after being made and to be heated above room temperature.

The process has been found to be also effective when aluminum sulfate is substituted by any of the equivalent precipitating substances listed above, used in amounts related to that of the aluminum sulfate as corresponds to the respective ratios shown above.

It has also been found that the sharpening agent added to the dispersion can be the same or different from that in the precipitating medium. Furthermore, the precipitating medium may contain one or a mixture of the following salts wherein the total amount of salt is between 20 and 50 g. per liter of tap water:

Aluminum sulfate ($Al_2(SO_4)_3 \cdot 18H_2O$)
Copper sulfate ($Cu(SO_4)_2 \cdot 5H_2O$)
Calcium chloride ($CaCl_2$)
Zinc sulfate ($Zn(SO_4)_2 \cdot 7H_2O$)

If a higher salt concentration is selected, a spinnable yarn is still obtainable, although it will be too high in salt concentration and it will then be difficult to remove the salt at the extraction stage.

The above-described process according to the invention can be performed with advantage in apparatus as described for example, in and claimed in the copending application of Donaldson, Ser. No. 510,246, filed Nov. 29, 1965, now abandoned, or with processes and equipment U.S. Pat. Nos. 2,972,221 and 3,475,894.

Another example of a spinnable asbestos dispersion sharpened by an added dosage of sharpening agent whose quantity will not cause coagulation, is composed of:

3,000 g. asbestos fiber (trade designation: KB–374–3Z)
120 g. aluminum sulfate $Al_2(SO_4)_3 \cdot 18H_2O$
90 g. Silastan wetting agent DMK (alkylbenzene sulfonate with 50 percent active washing agent)
1,000 g. SP soap (technical quality sodium stearate with 80 percent fat content)
81 liter water with a hardness of 24° dH The asbestos is placed loosely in a stirring container. Added are 27 liters of water at 50° C. The resulting aqueous asbestos suspension is given an admixture of dissolved aluminum sulfate, and the whole is stirred gently. The soap previously dissolved in water is then added together with the wetting agent. The ratio of soap to wetting agent dissolved in water is 10:1. The solution has a temperature of about 90° C. After adding the wetting agent and soap, the remaining 54 liters of water at an average temperature of 45° C. are added. The mixture is then left standing for about 20 minutes during which time it is stirred until uniformly good flowing properties are obtained. Thereafter the mixture is suitable to be spun through jet nozzles or the like into or through a bath of precipitant which causes coagulation of the fibers. The apparatus used for this purpose may also correspond, for example, to any of those described in U.S. Pat. No. 2,972,221, or in U.S. Pat. No. 3,475,894.

If in the composition last exemplified the 120 g. of aluminum sulfate are substituted by another sharpening agent, the following substitute quantities respectively are applicable:

| | |
|---|---|
| Sulfurous acid | 35.5 g. (as $SO_2$) |
| Copper sulfate $CuSO_4 \cdot 5H_2O$ | 135.5 g. |
| Zinc chloride | 73.2 g. |
| Calcium chloride $CaCl_2$ | 60.0 g. |
| Magnesium sulfate $MgSO_4 \cdot 7H_2O$ | 132.0 g. |
| Calcium carbonate | 54.0 g. |
| Calcium oxide | 30.0 g. |

It has been found that generally a good extruding dispersion is obtained if the aqueous suspension of asbestos fibers is given an addition of about 50 to 150 g. aluminum sulfate per kg. of (dry) soap contained in the dispersion, particularly favorable results having been attained with an addition of about 120 g. aluminum sulfate per kg. soap as exemplified by the above-specified sample composition. Corresponding preferred limits apply to the other sharpening agents, also as explained above.

I claim:

1. In the process of making coherent asbestos structures, which comprises preparing a dispersion of asbestos fibers in a medium consisting essentially of water with water-soluble soap as dispersing agent, shaping the dispersion, and contacting the shaped dispersion with precipitating medium to effect coagulation of the fibers, the improvement which comprises admixing to the asbestos dispersion, prior to shaping it, a coagulating agent reactive with the soap to effect precipitation thereof, said agent being brought into the dispersion in the form of an aqueous solution and having a quantity below the one required to cause soap precipitation, whereby the asbestos dispersion containing the admixed coagulating agent remains stable prior to shaping the dispersion.

2. The process according to claim 1 which comprises admixing said coagulating agent to said asbestos dispersion by dissolving said agent in the water from which thereafter the asbestos dispersion is prepared.

3. The process according to claim 1 which comprises admixing said coagulating agent to said asbestos dispersion by dissolving said agent in water and slowly mixing the resulting solution into the dispersion.

4. In the process of making coherent asbestos structures, which comprises preparing a dispersion of asbestos fibers in a medium consisting essentially of water with water-soluble soap as dispersing agent, shaping the dispersion, and contacting the shaped dispersion with precipitating medium to effect coagulation of the fibers, the improvement which comprises admixing to the asbestos dispersion, prior to shaping it, a coagulating agent reactionable with the soap to effect precipitation thereof, said agent being brought into the dispersion in the form of an aqueous solution and amounting to 20 percent to 80 percent of the minimum quantity required to cause precipitation of the soap in the dispersion.

5. In the process according to claim 4, said agent being aluminum sulfate.

6. The process according to claim 4, wherein the asbestos content amounts to about 2 percent chrysolite asbestos in said dispersion, and said admixed coagulating agent is aluminum sulfate in a quantity of at least 30 percent but less than 240 grams per kg. of dry soap in the dispersion.

7. In the process according to claim 4, said coagulating agent in the dispersion being an acid.

8. The process according to claim 4, in which said coagulating agent in the dispersion is hydrochloric acid or sulfuric acid.

9. In the process of making coherent asbestos, strands which comprises passing a soap-containing aqueous dispersion of asbestos fibers through a shaping device to form a travelling strand and bringing the travelling strand of dispersion into contact with coagulating liquid, the improvement which comprises admixing to the aqueous dispersion of asbestos, prior to passing the dispersion through the shaping device, a coagulant in a quantity of at least 30 grams per kg. of dry soap in the dispersion, but less than the minimum amount required to cause coagulation of the dispersion, so that the coagulant-containing dispersion of asbestos remains noncoagulated before forming the strand and before contacting it with the coagulating liquid.

10. In the process according to claim 9, said quantity of coagulant admixed to said asbestos aqueous dispersion being 20 percent to 80 percent of said minimum amount required to cause coagulation of the dispersion.

11. The process according to claim 9, in which said aqueous dispersion of asbestos contains water-soluble soap as dispersing agent, said coagulating agent admixed to said dispersion being aluminum sulfate in a quantity of about 50 grams to about 200 grams per kg. of dry soap content.

12. The process according to claim 11, wherein said quantity of aluminum sulfate is about 120 grams per kg. of dry soap content.

13. An asbestos fiber material produced by the process according to claim 9.

* * * * *